(12) United States Patent
Bianconi et al.

(10) Patent No.: US 8,511,572 B2
(45) Date of Patent: Aug. 20, 2013

(54) ENCODED INFORMATION READING TERMINAL WITH DATA FORMATTING FUNCTIONALITY

(75) Inventors: Thomas Bianconi, Aurora, NY (US); Bill Field, Morristown, NY (US); Matthew Pankow, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 13/222,044

(22) Filed: Aug. 31, 2011

(65) Prior Publication Data

US 2013/0048734 A1     Feb. 28, 2013

(51) Int. Cl.
*G06K 19/00*     (2006.01)

(52) U.S. Cl.
USPC ........................................ 235/492; 235/487

(58) Field of Classification Search
USPC ........... 235/435, 439, 462, 487, 492; 340/10, 340/572
See application file for complete search history.

(56) References Cited

U.S. PATENT DOCUMENTS

| | | | |
|---|---|---|---|
| 5,869,819 A | 2/1999 | Knowles et al. |
| 5,905,251 A | 5/1999 | Knowles |
| 5,932,862 A | 8/1999 | Hussey et al. |
| 5,965,863 A | 10/1999 | Parker et al. |
| 5,992,752 A | 11/1999 | Wilz, Sr. et al. |
| 6,027,024 A | 2/2000 | Knowles |
| 6,045,048 A | 4/2000 | Wilz et al. |
| 6,068,188 A | 5/2000 | Knowles |
| 6,182,897 B1 | 2/2001 | Knowles et al. |
| 6,321,989 B1 | 11/2001 | Wilz, Sr. et al. |
| 6,321,991 B1 | 11/2001 | Knowles |
| 6,321,992 B1 | 11/2001 | Knowles et al. |
| 6,345,764 B1 | 2/2002 | Knowles |
| 6,347,743 B2 | 2/2002 | Wilz et al. |
| 6,454,168 B1 | 9/2002 | Brandt et al. |
| 6,494,376 B1 | 12/2002 | Davis et al. |
| 6,513,714 B1 | 2/2003 | Davis et al. |
| 6,540,140 B1 | 4/2003 | Knowles et al. |
| 6,561,427 B2 | 5/2003 | Davis et al. |
| 6,565,005 B1 | 5/2003 | Wilz et al. |
| 6,578,766 B1 | 6/2003 | Parker et al. |
| 6,585,157 B2 | 7/2003 | Brandt et al. |

(Continued)

FOREIGN PATENT DOCUMENTS

WO     WO 2013049281 A1     4/2013

OTHER PUBLICATIONS

Apr. 19, 2013 Notice of Allowance in U.S. Appl. No. 12/942,197.

*Primary Examiner* — Michael G Lee
*Assistant Examiner* — Matthew Mikels
(74) *Attorney, Agent, or Firm* — Heslin Rothenberg Farley & Mesiti P.C.

(57) ABSTRACT

An encoded information reading (EIR) terminal can comprise a microprocessor, a memory, a communication interface, and an EIR device, all communicatively coupled to a system bus. The EIR device can be provided by a bar code reading device, an RFID reading device, and/or a card reading device. The EIR terminal can be configured, responsive to reading an encoded message by the EIR device, to produce a decoded message string by decoding the encoded message. The EIR terminal can be further configured to produce an output string by formatting the decoded message string according to one or more formatting commands. The formatting can comprise excluding from the output string a symbol of a specified encoding type according to a Discard Data formatting command.

10 Claims, 4 Drawing Sheets

(56) References Cited

U.S. PATENT DOCUMENTS

| | | |
|---|---|---|
| 6,622,919 B1 | 9/2003 | Wilz et al. |
| 6,631,845 B2 | 10/2003 | Barkan |
| 6,758,403 B1 | 7/2004 | Keys et al. |
| 6,854,655 B2 | 2/2005 | Barkan |
| 6,941,026 B1 | 9/2005 | Nadabar et al. |
| 6,978,930 B2 | 12/2005 | Harding et al. |
| 7,090,579 B2 | 8/2006 | Tarantino |
| 7,357,325 B2 | 4/2008 | Zhu et al. |
| 7,470,183 B2 | 12/2008 | Wishart |
| 7,510,116 B2 | 3/2009 | Robb et al. |
| 7,578,442 B2 | 8/2009 | Knowles et al. |
| 7,594,610 B2 | 9/2009 | Walczyk et al. |
| 7,604,175 B2 | 10/2009 | Zhu et al. |
| 7,607,581 B2 | 10/2009 | Kotlarsky et al. |
| 7,660,638 B2 | 2/2010 | Chand |
| 2002/0066788 A1 | 6/2002 | Knowles |
| 2002/0139856 A1 | 10/2002 | Barkan |
| 2002/0148899 A1 | 10/2002 | Brandt et al. |
| 2002/0169016 A1 | 11/2002 | Tarantino |
| 2002/0190127 A1 | 12/2002 | Davis et al. |
| 2002/0193160 A1 | 12/2002 | Tarantino |
| 2003/0024990 A1 | 2/2003 | Wilz et al. |
| 2003/0057282 A1 | 3/2003 | Brandt et al. |
| 2003/0173405 A1 | 9/2003 | Wilz et al. |
| 2004/0056099 A1 | 3/2004 | Barkan |
| 2004/0079804 A1 | 4/2004 | Harding et al. |
| 2004/0247206 A1* | 12/2004 | Kaneda et al. ............ 382/305 |
| 2005/0277458 A1 | 12/2005 | Wishart |
| 2008/0132314 A1 | 6/2008 | Robb et al. |
| 2012/0111943 A1 | 5/2012 | Meier et al. |
| 2013/0032634 A1 | 2/2013 | McKirdy |

* cited by examiner

ENCODED INFORMATION READING TERMINAL WITH DATA FORMATTING FUNCTIONALITY

FIELD OF THE INVENTION

The present invention relates generally to encoded information reading terminals, and in particular to encoded information reading terminals performing data formatting.

BACKGROUND OF THE INVENTION

Encoded information reading (EIR) terminals are widely used in retail stores, shipping facilities, etc. In many EIR applications (e.g., bar code reading applications), two or more bar codes can be attached to a bar code bearing item (e.g., a retail item, a medical record item, or a pharmacy item), and hence the encoded message can comprise two or more bar codes.

SUMMARY OF THE INVENTION

In one embodiment, there is provided an encoded information reading (EIR) terminal. The EIR terminal can comprise a microprocessor, a memory, a communication interface, and an EIR device, all communicatively coupled to a system bus. The EIR device can be provided by a bar code reading device, an RFID reading device, and/or a card reading device. The EIR terminal can be configured, responsive to reading an encoded message by the EIR device, to produce a decoded message string by decoding the encoded message. The EIR terminal can be further configured to produce an output string by formatting the decoded message string according to one or more formatting commands. The formatting can comprise excluding from the output string a symbol of a specified encoding type according to a Discard Data formatting command.

In one embodiment, the formatting commands can be stored in the terminal's memory.

In one embodiment, the EIR terminal can be further configured to store the formatting commands in its memory responsive to receiving one or more formatting commands via the EIR device or via the communication interface.

In one embodiment, one or more formatting commands can be grouped together into a data format.

In one embodiment, a data format can comprise a parameter specifying the type of an EIR terminal to which one or more formatting commands should only apply.

In one embodiment, a data format can comprise a parameter specifying a symbology identifier indicating that one or more formatting commands should only apply to messages encoded using the identified symbology.

In one embodiment, a data format can comprise a parameter specifying a message length indicating that one or more formatting commands should only apply to messages having a length equal to the specified message length.

In one embodiment, one or more data formats can be grouped into two or more data format groups defining a primary data format and one or more alternative data formats.

In one embodiment, the EIR terminal can be configured to switch between the primary and alternative data formats responsive to inputting a pre-defined message by the EIR device.

In one embodiment, the EIR terminal can be configured to switch between the primary and alternative data formats responsive to a user interface action.

BRIEF DESCRIPTION OF THE DRAWINGS

The objects and features of the invention can be better understood with reference to the claims and drawings described below. The drawings are not necessarily to scale, the emphasis is instead generally being placed upon illustrating the principles of the invention. Within the drawings, like reference numbers are used to indicate like parts throughout the various views.

DETAILED DESCRIPTION OF THE INVENTION

In one embodiment, there is provided an encoded information reading (EIR) terminal comprising one or more EIR devices, including a bar code reading device, an RFID reading device, and/or a card reading device. The EIR terminal can be capable of reading bar codes, RFID tags and/or other encoded message carriers.

An encoded message can be decoded into a string comprising alphanumeric and non-alphanumeric characters. Encoded message, for example, a UPC bar code that comprises twelve encoded characters representing numerical digits, can be used to convey identification of the source and the model of a product. The EIR terminal can be configured, responsive to reading an encoded message by the EIR device, to produce a decoded message string by decoding the encoded message.

In many EIR applications (e.g., bar code reading applications) there is a need to format the decoded message string: for example, a prefix or a suffix can be added to the decoded message string; the decoded message string can be truncated to a given number of characters; the decoded message string can be truncated once a particular character appears in the sting; etc. To perform formatting of the decoded message string, the EIR terminal can, in one embodiment, be configured to produce an output string by formatting the decoded message string according at least one formatting command as described herein infra.

Furthermore, in many EIR applications (e.g., bar code reading applications) there is a need to discard bar codes of a certain encoding type in situations when a bar code bearing item has multiple bar codes attached to it. To address this need, the EIR terminal can, in one embodiment, be configured to exclude from the output string a symbol (e.g., a bar code) of a specified encoding type according to a Discard Data formatting command as described herein infra.

Figure 1:
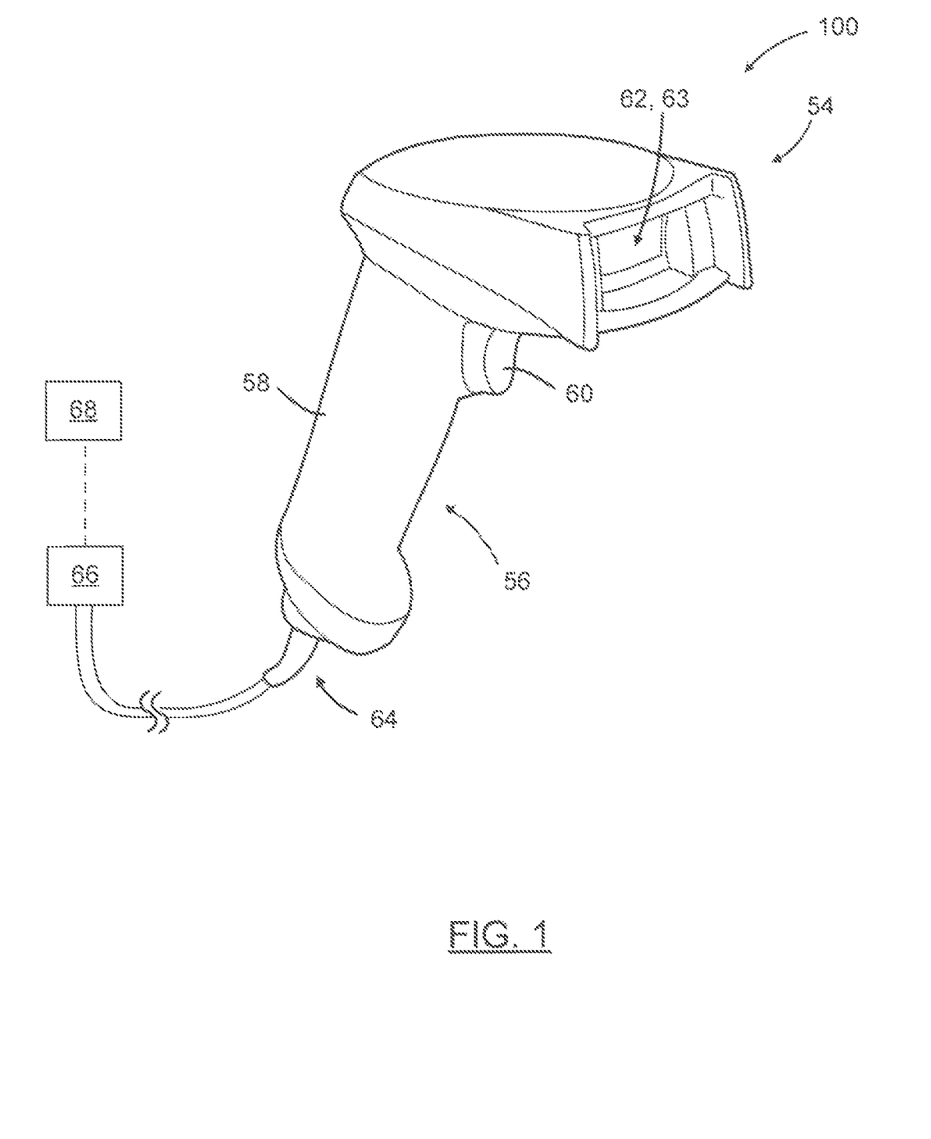
FIG. 1 schematically illustrates one embodiment of an EIR terminal.

In an illustrative embodiment, shown in FIG. 1, there is provided an EIR terminal 100 including a housing 52 comprising a head portion 54 and a handle portion 56, the latter further comprising a hand grip 58 and a trigger 60. The trigger 60 can be used to initiate signals for activating frame readout and/or certain decoding processes. Other components of EIR terminal 100 can be disposed within the housing 52. For example, an image sensor 62 can be disposed in the head portion 54 behind a housing window 63. The image sensor 62 can be configured to output an electrical signal representative of light incident on the image sensor.

EIR terminal 100 can further comprise an I/O interface which in the illustrative embodiment of FIG. 1 can be communicatively coupled to a wired connection 66. The I/O interface can be used to communicatively couple EIR terminal 100 to a companion device 68 such as a register and/or peripheral data capture devices in a point-of-sale (POS) application. Other configurations of the I/O interface may utilize wireless communication technology and/or contact-type features that do not require wires and/or wired connection 66. In certain applications of EIR terminal 100 for example, the companion device 68 may be provided by a docking station with corresponding mating contacts and/or connectors that are useful to exchange power and data, including image data captured by the imaging module 62.

Although not incorporated in the illustrative embodiment of FIG. 1, EIR 100 can also comprise a number of peripheral devices, including a display for displaying such information as image frames captured by the terminal, a keyboard, and a pointing device.

EIR terminal 100 can be used, for example, for bar code reading and decoding in POS and other applications. A skilled artisan would appreciate the fact that other uses of EIR terminal 100 are within the scope of this disclosure.

While FIG. 1 illustrates a hand held housing, a skilled artisan would appreciate the fact that other types and form factors of terminal housings are within the scope of this disclosure.

Figure 2:
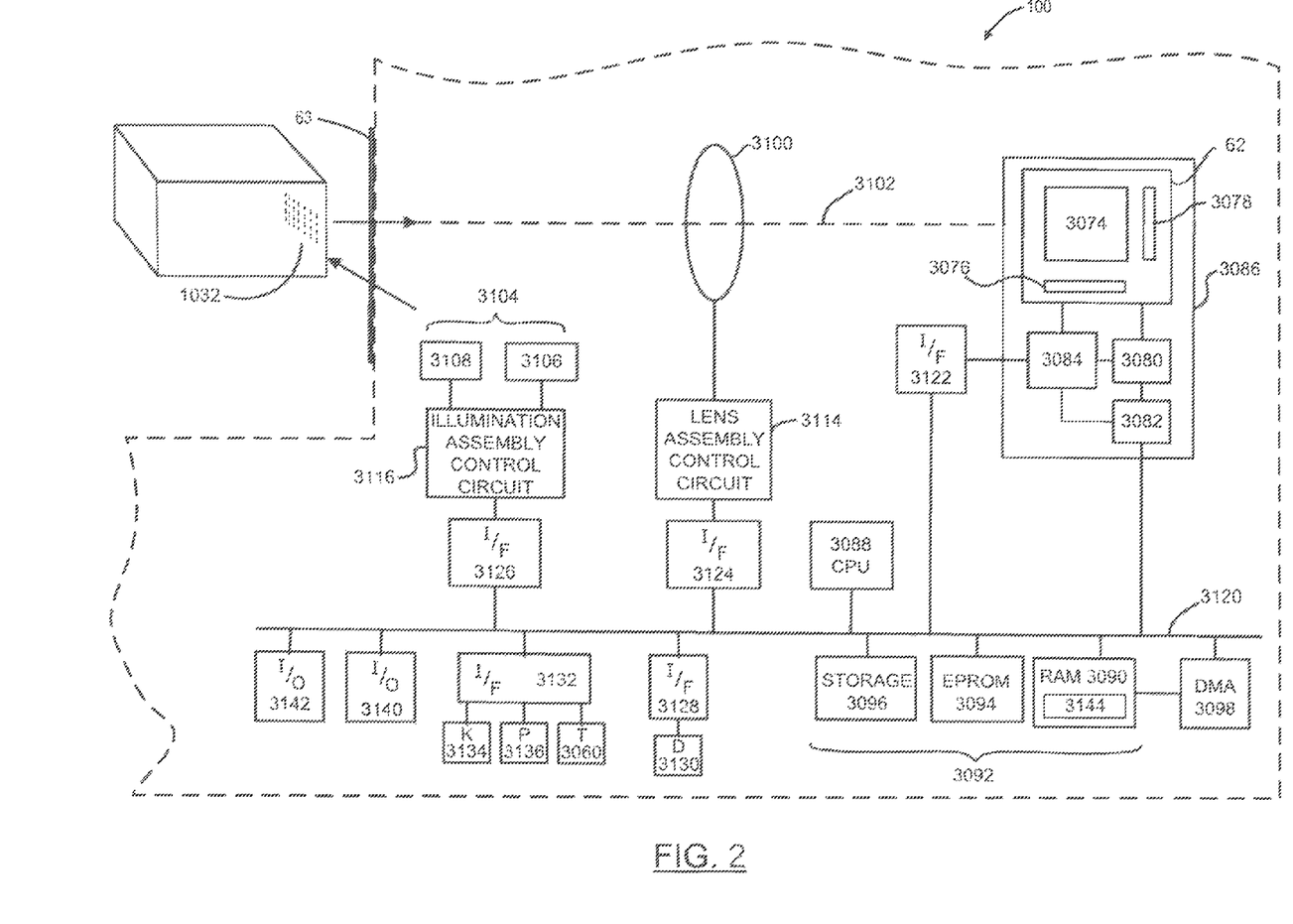
FIG. 2 schematically illustrates a component-level layout of the EIR terminal.

FIG. 2 illustrates a block diagram of one embodiment of the EIR terminal. EIR terminal 100 can comprise a multiple pixel image sensor 62, which in one embodiment can be provided by a charge-coupled device (CCD) image sensor. In another embodiment, the image sensor 62 can be provided by a complementary metal-oxide-semiconductor (CMOS) image sensor. A skilled artisan would appreciate the fact that other types of image sensors are within the scope of this disclosure.

The image sensor 62 can comprise a multiple pixel image sensor array 3074 having pixels arranged in rows and columns of pixels, column circuitry 3076, and row circuitry 3078. Associated with the image sensor 62 can be amplifier circuitry 3080, and an analog-to-digital (A/D) converter 3082 which can be configured to convert image information in the form of analog signals read out of multiple pixel image sensor array 3074 into image information in the form of digital signals. Also associated with the image sensor 62 can be timing and control circuit 3084 for use in controlling, e.g., the exposure period of image sensor 62, and/or gain applied to the amplifier 3080. The noted circuit components 62, 3080, 3082, and 3084 can be packaged into a common image sensor integrated circuit 3086.

In operation, image signals can be read out of image sensor 62, converted and stored into one or more memories such as RAM 3090. A memory 3092 can include RAM 3090, a non-volatile memory such as EPROM 3094, and a storage memory device 3096 such as may be provided by a flash memory or a hard drive memory.

In one embodiment, EIR terminal 100 can include a microprocessor 3088 which can be configured to read out image data stored in memory 3092 and subject such image data to various image processing algorithms. In one embodiment, microprocessor 3088 can be configured to output a decoded message data corresponding to scanned decodable indicia by processing a digital signal representative of an analog signal read out of the image sensor 62.

EIR terminal 100 can also include a direct memory access unit (DMA) 3098 for routing image information read out from image sensor 62 that has been subject to conversion to RAM 3090. In another embodiment, EIR terminal 100 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 62 and RAM 3090 are within the scope of this disclosure.

EIR terminal 100 can also include an imaging lens assembly 3100 for focusing an image of the decodable indicia 1032 onto image sensor 62. Imaging light rays can be transmitted about an optical axis 3102. EIR terminal 100 can also include an illumination assembly 3104 comprising one or more illumination light source banks 3106 comprising one or more LEDS for generating an illumination pattern substantially corresponding to the field of view of the image sensor 62.

In one embodiment, EIR terminal 100 can also include an aiming pattern light source bank 3108 comprising one or more LEDs for generating an aiming pattern. In operation, the terminal 100 can be oriented relatively to the product 3030 by an operator of the terminal 100 in such manner that the aiming pattern is projected on the encoded symbol character 3032.

In a further aspect, EIR terminal 100 can include various control circuits. Lens assembly 3100 can be controlled with use of lens assembly control circuit 3114 and the illumination assembly 3104 comprising illumination pattern light source bank 3106 and aiming pattern light source bank 3108 can be controlled with use of illumination assembly control circuit 3116. Lens assembly control circuit 3114 can send signals to lens assembly 3100, e.g., for changing a focal length and/or a best focus distance of lens assembly 3100. Illumination assembly control circuit 3116 can send signals to illumination pattern light source bank 3106, e.g., for changing a level of illumination output.

In a further aspect, EIR terminal 100 can include various interface circuits for coupling several of the peripheral devices to system address/data bus (system bus) bus 3120, for communication with the processor 3088 also coupled to system bus 3120. EIR terminal 100 can include interface circuit 3122 for coupling image sensor timing and control circuit 3084 to system bus 3120, interface circuit 3124 for coupling the lens assembly control circuit 3114 to system bus 3120, interface circuit 3126 for coupling the illumination assembly control circuit 3116 to system bus 3120, interface circuit 3128 for coupling a display 3130 to system bus 3120, interface circuit 3132 for coupling a keyboard 3134, a pointing device 3136, and trigger 3060 to system bus 3120.

In a further aspect, EIR terminal 100 can include one or more I/O interfaces 3140, 3142 for providing communication with external devices (e.g., a cash register server, a store server, an inventory facility server, a local area network base station, a cellular base station). I/O interfaces 3140, 3142 can be interfaces of any combination of known computer interfaces, e.g., Ethernet (IEEE 802.3), USB, IEEE 802.11, Bluetooth, CDMA, and GSM, and may couple with processors, such as interface microcontrollers, and memories to carry out some or all the functions described herein.

In a further aspect, devices that read bar codes, read RFID, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is an EIR terminal for purposes of this present disclosure.

Figure 3:
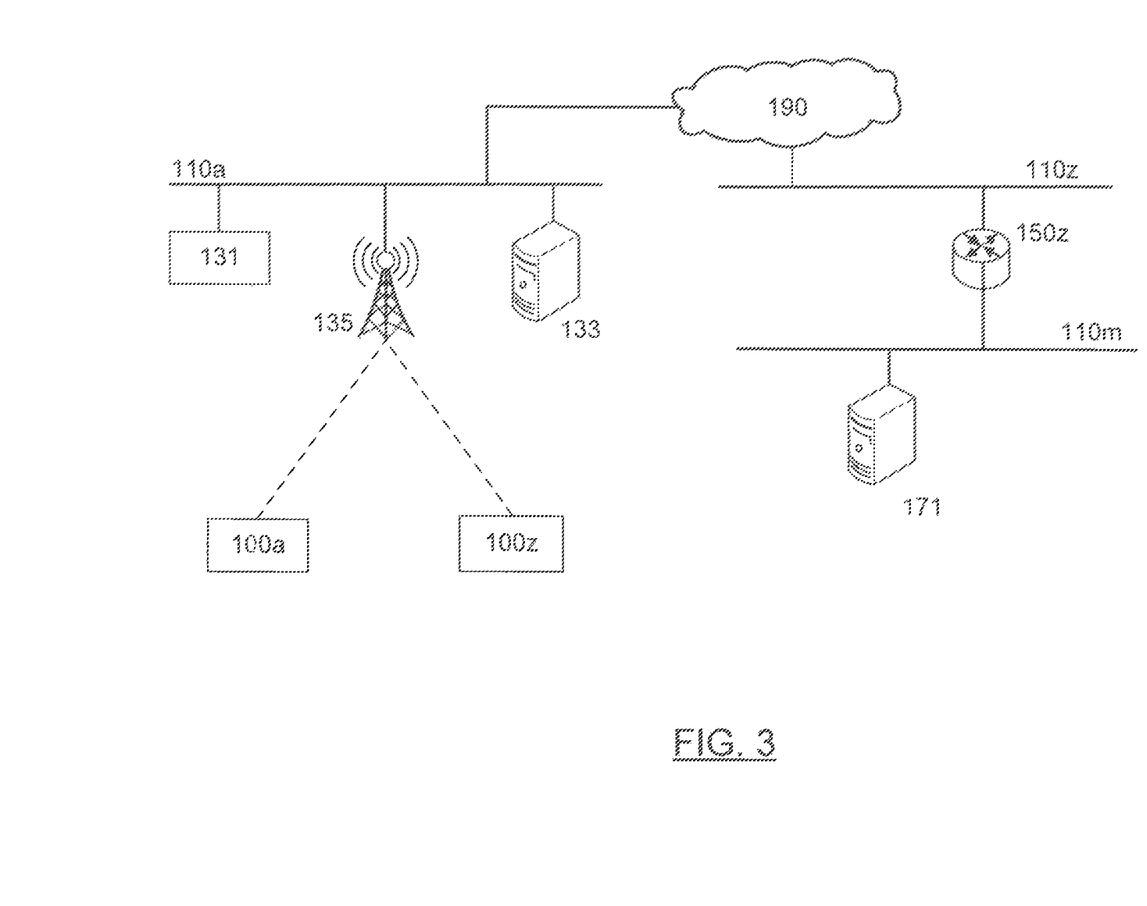
FIG. 3 schematically illustrates a network-level layout of a data collection system utilizing EIR terminals.

In one embodiment, EIR terminal 100 can be incorporated into a retail store data collection system 1000 schematically illustrated in FIG. 3, and can be employed at a checkout register for scanning identification tags (e.g., bar code tags) of retail items being purchased by retail customers. Data collection system 1000 can include a plurality of EIR terminals 100a-100z in communication with a plurality of interconnected networks 110a-110z. EIR terminal 100 can connect to one or more networks 110a-110z, e.g., via a wireless access point 135. In one embodiment, at least one of networks 110a-110z can be provided by an IEEE 802.11x-compliant wireless network. In another embodiment, at least one of networks 110a-110z can be provided by an Ethernet network. In another embodiment, at least one of networks 110a-110z can be provided by a local area network (LAN). In another embodiment, at least one of networks 110a-110z can be provided by a wide area network (WAN). While different networks are designated herein, it is recognized that a single network as seen from the network layer of the OSI model can comprise a plurality of lower layer networks, i.e., what can be regarded as a single Internet Protocol (IP) network, can include a plurality of different physical networks.

In one embodiment, EIR terminal 100 can exchange messages with one or more external computers, including, for example, checkout register 131, retail store server 133, and/or remote server 171. A "computer" herein shall refer to a programmable device for data processing, including a central processing unit (CPU) 310, a memory 320, and at least one communication interface. A computer can be provided, e.g., by a personal computer (PC) running Windows™ operating system. A skilled artisan would appreciate the fact that other hardware platforms and operating systems are within the spirit and the scope of the invention.

In a further aspect, EIR terminal 100 can be communicatively coupled via wired or wireless interface to checkout register 131. EIR terminal 100 can further be in communication with retail store server 133 via wireless access point 135 and network 110a. EIR terminal 100 can further be in communication with remote server 171 via wireless access point 135 and networks 110a, 110b, 110z. A skilled artisan would appreciate the fact that other methods of EIR terminal communicatively coupling to checkout register 131, store server 133, and remote server 171 are within the scope of this disclosure.

At least one of the messages transmitted by EIR terminal 100 to one or more external computers 131, 133, and/or 171 can include decoded message data corresponding to, e.g., a bar code label or an RFID label attached to a retail item. For example, EIR terminal 100 can transmit to the checkout register 131 a product identifier encoded by a bar code label attached to the product. In another example, EIR terminal 100 can transmit a request to retail store server 133 to retrieve product information corresponding to a product identifier encoded by a bar code label attached to the product.

As noted herein supra, EIR terminal 100 can be configured to produce an output string by formatting the decoded message string according at least one formatting command.

In one embodiment, a formatting command can be a part of a data format. A data format can comprise one or more parameters and one or more formatting commands.

In one embodiment, a data format can be inputted into EIR terminal 100 via the EIR device (e.g., by scanning a pre-defined bar code indicating the start of a data format). In another embodiment, a data format can be inputted into EIR terminal 100 via the terminal's communication interface (e.g., transmitted wirelessly from an external computer).

In one embodiment, a data format can be stored in the terminal's memory, and can be applied to all bar codes scanned after the command has been stored in the memory. In one embodiment, two or more data formats can be simultaneously stored in the terminal's memory. In one embodiment, multiple data formats can be grouped into two or more data format groups defining a primary data format and one or more alternative data formats. In one embodiment, EIR terminal 100 can be configured to switch between primary and alternative data formats responsive to inputting a pre-defined message by the EIR device (e.g., responsive to scanning a pre-defined bar code). In another embodiment, EIR terminal 100 can be configured to switch between primary and alternative data formats responsive to a user interface action (e.g., responsive to a particular a keyboard button or combination of buttons having been pressed by the terminal's user).

As noted herein supra, a data format can comprise one or more parameters. In one embodiment, a data format can comprise a parameter specifying the data format group (primary or alternative) to which the data format should be appended.

In one embodiment, a data format can comprise a parameter specifying a type of an EIR terminal to which the data format should only apply. In a further aspect, a data format containing a wildcard terminal type can be applicable to all terminal types.

In one embodiment, a data format can comprise a parameter specifying a symbology identifier. The parameter indicates that the data format should only apply to messages encoded using the identified symbology.

In one embodiment, a data format can comprise a parameter specifying a message length. The parameter indicates that the data format should only apply to messages having a length equal to a specified message length. In a further aspect, a data format containing a wildcard message length can be applicable to all messages.

In a further aspect, a data format can comprise one or more formatting commands. In one embodiment, EIR terminal 100 can accept one or more Send data commands.

In one embodiment, EIR terminal 100, according to Send All Characters data command, include in the output string all characters from the decoded message string starting from the current cursor position, and then insert a specified character.

In one embodiment, EIR terminal 100 can, according to Send Multiple Characters data command, include in the output string a specified number characters from the decoded message string followed by a specified character.

In one embodiment, EIR terminal 100 can, according to Send All Characters up to Particular Character data command, include in the output string all characters from the decoded message string starting from the current cursor position and continuing to, but not including, a first specified character, and then insert a second specified character.

In one embodiment, EIR terminal 100 can, according to Send All but the Last Characters data command, include in the output string all but the last nn characters from the decoded message string, starting from the current cursor position, where nn is a positive integer specified as part of the command.

In one embodiment, EIR terminal 100 can, according to Insert Character data command, insert into the output string a specified character a specified number of times.

In one embodiment, EIR terminal 100 can, according to Insert Symbology Name data command, insert the name of the message symbology into the output string.

In one embodiment, EIR terminal 100 can, according to Insert Bar Code Length data command, insert the bar code length into the output string.

In one embodiment, EIR terminal 100 can, according to Insert Key Strokes data command, insert a key stroke or a combination of key strokes into the output string.

In a further aspect, a data format can comprise one or more formatting commands. In one embodiment, EIR terminal 100 can accept one or more Move data commands.

In one embodiment, EIR terminal 100 can, according to Move Cursor Forward data command, move the cursor forward a specified number of characters from the current cursor position.

In one embodiment, EIR terminal 100 can, according to Move Cursor Backward data command, move the cursor backward a specified number of characters from the current cursor position.

In one embodiment, EIR terminal 100 can, according to Move Cursor to the Beginning data command, move the cursor to the first character in the decoded message string.

In one embodiment, EIR terminal 100 can, according to Move Cursor to the End data command, move the cursor to the last character in the decoded message string.

In a further aspect, a data format can comprise one or more formatting commands. In one embodiment, EIR terminal 100 can accept one or more Search data commands.

In one embodiment, EIR terminal 100 can, according to Character Search Forward data command, move the cursor to the first occurrence of a specified character after the current cursor position.

In one embodiment, EIR terminal 100 can, according to Character Search Backward data command, move the cursor to the first occurrence of a specified character before the current cursor position.

In one embodiment, EIR terminal 100 can, according to String Search Forward data command, move the cursor to the starting character of the first occurrence of a specified string after the current cursor position.

In one embodiment, EIR terminal 100 can, according to String Search Backward data command, move the cursor to the starting character of the first occurrence of a specified string before the current cursor position.

In one embodiment, EIR terminal 100 can, according to Non-Matching Character Search Forward data command, move the cursor to the first occurrence of a character different from a specified character after the current cursor position.

In one embodiment, EIR terminal 100 can, according to Non-Matching Character Search Backward data command, move the cursor to the first occurrence of a character different from a specified character before the current cursor position.

In a further aspect, a data format can comprise one or more formatting commands. In one embodiment, EIR terminal 100 can accept one or more Miscellaneous data commands.

In one embodiment, EIR terminal 100 can, according to Suppress Characters data command, suppress all occurrences of specified characters starting at the current cursor position, as the cursor is advanced by other commands.

In one embodiment, EIR terminal 100 can, according to Stop Suppressing Characters data command, clear the suppressed character list.

In one embodiment, EIR terminal 100 can, according to Replace Characters data command, replace all occurrences of specified characters starting at the current cursor position, without moving the cursor.

In one embodiment, EIR terminal 100 can, according to Stop Replacing Characters data command, clear the character replacement list.

In one embodiment, EIR terminal 100 can, according to Compare Characters data command, compare a specified character to the character at the current cursor position, and move the cursor forward one position if the characters are equal.

In one embodiment, EIR terminal 100 can, according to Compare String data command, compare a specified string to the string at the current cursor position, and move the cursor forward past the end of the string if the strings are equal.

In one embodiment, EIR terminal 100 can, according to Check for Number data command, abort the current format processing if the character at the current cursor position is non-numeric.

In one embodiment, EIR terminal 100 can, according to Check for Non-Numeric Character data command, abort the current format processing if the character at the current cursor position is numeric.

In one embodiment, EIR terminal 100 can, according to Insert Delay data command, insert a delay of a specified length starting from the current cursor position.

In a further aspect, in some applications, two or more bar codes can be attached to a bar code bearing item (e.g., a retail item, a medical record item, or a pharmacy item), and hence the encoded message can comprise two or more bar codes. In some applications, a need can arise to discard bar codes of a certain encoding type in a situation when a bar code bearing item has multiple bar codes attached to it. To address this need, EIR terminal 100 can be configured to exclude from the output string a symbol (e.g., a bar code) of a specified encoding type according to a Discard Data formatting command. For example, a Discard Data formatting command can exclude from the output string all Code 128 symbols.

In one embodiment, EIR terminal 100 can be configured to exclude from the output string a symbol of a specified encoding type only if the decoded message corresponding to the symbol starts with a specified character. For example, a Discard Data formatting command can exclude from the output string all Code 128 symbols for which the decoded message corresponding to a symbol starts with the character 'A'.

Figure 4:
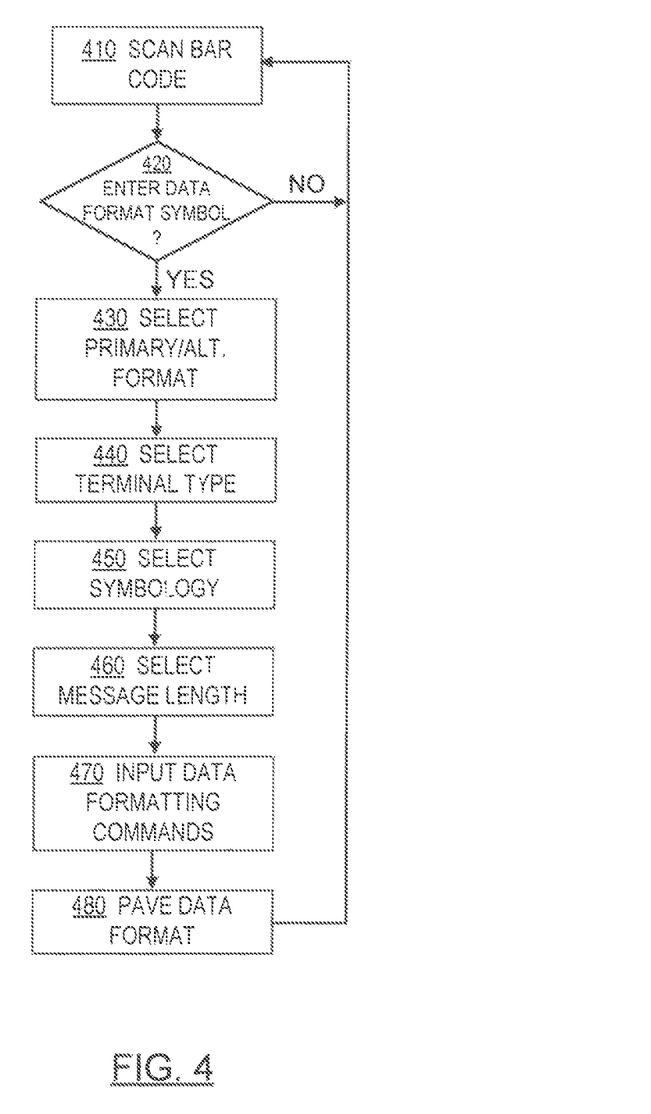
FIG. 4 schematically illustrates one embodiment of a method of inputting a data format by the EIR terminal.

One embodiment of a method of inputting a data format by EIR terminal 100 is now being described with references to FIG. 4.

At step 410, EIR terminal 100 can scan a bar code symbol.

At step 420, EIR terminal 100 can, responsive to ascertaining that the scanned symbol is the Enter Data Format special symbol, continue processing at step 430. Otherwise, the method can perform processing other symbols within the process 499.

At step 430, EIR terminal 100 can, by scanning a special symbol, select primary/alternative data format.

At step 440, EIR terminal 100 can, by scanning a special symbol, select the terminal type to which the format should apply. In one embodiment, a wildcard terminal type can indicate that the format applies to all terminal types.

At step 450, EIR terminal 100 can, by scanning a special symbol, select the symbology type to which the format should apply.

At step 460, EIR terminal 100 can, by scanning a special symbol, select the message length to which the format should apply. In one embodiment, a wildcard message length can indicate that the format should apply to all message lengths.

At step 470, EIR terminal 100 can, by scanning one or more special symbols, input one or more data commands described herein supra.

At step 480, EIR terminal 100 can, by scanning a special symbol, save the inputted data format. The method can loop back to step 410.

While the present invention has been particularly shown and described with references to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems methods and apparatus that are described herein is as follows:

A1. An encoded information reading (EIR) terminal comprising:

a microprocessor communicatively coupled to a system bus;

a memory communicatively coupled to said system bus;

a communication interface coupled to said system bus;

an EIR device communicatively coupled to said system bus, the EIR device selected from the group consisting of: a bar code reading device, an RFID reading device, and a card reading device;

wherein said EIR terminal is configured, responsive to reading an encoded message by said EIR device, to produce a decoded message string by decoding said encoded message;

wherein said EIR terminal is further configured to produce an output string by formatting said decoded message string according to one or more formatting commands;

wherein said formatting comprises excluding from said output string a symbol of a specified encoding type according to a Discard Data formatting command.

A2. The EIR terminal of A1, wherein said one or more formatting commands are stored in said memory.

A3. The EIR terminal of A1 further configured to store said one or more formatting commands in said memory responsive to receiving said one or more formatting commands via one of: said EIR device and said communication interface.

A4. The EIR terminal of A1, wherein said one or more formatting commands are grouped together into a data format.

A5. The EIR terminal of A1, wherein said one or more formatting commands are grouped together into a data format; and wherein said data format comprises a parameter specifying a type of an EIR terminal to which said one or more formatting commands should only apply.

A6. The EIR terminal of A1, wherein said one or more formatting commands are grouped together into a data format; and wherein said data format comprises a parameter specifying an identifier of a symbology, said parameter indicating that said one or more formatting commands should only apply to messages encoded using a symbology identified by said identifier.

A7. The EIR terminal of A1, wherein said one or more formatting commands are grouped together into a data format; and wherein said data format comprises a parameter specifying a length of a message, said parameter indicating that said one or more formatting commands should only apply to messages having a length equal to a value of said parameter.

A8. The EIR terminal of A1, wherein said one or more formatting commands are grouped together into a data format; and wherein one or more data formats are grouped into two or more data format groups defining a primary data format and one or more alternative data formats.

A9. The EIR terminal of A1, wherein said one or more formatting commands are grouped together into a data format;

wherein one or more data formats are grouped into two or more data format groups defining a primary data format and one or more alternative data formats; and wherein said EIR terminal is configured to switch between said primary and alternative data formats responsive to inputting a pre-defined message by said EIR device.

A10. The EIR terminal of A1, wherein said one or more formatting commands are grouped together into a data format;

wherein one or more data formats are grouped into two or more data format groups defining a primary data format and one or more alternative data formats; and wherein said EIR terminal is configured to switch between said primary and alternative data formats responsive to a user interface action.

We claim:

1. An encoded information reading (EIR) terminal comprising:

a microprocessor communicatively coupled to a system bus;

a memory communicatively coupled to said system bus;

a communication interface coupled to said system bus;

an EIR device communicatively coupled to said system bus, the EIR device selected from the group consisting of: a bar code reading device, an RFID reading device, and a card reading device;

wherein said EIR terminal is configured, responsive to reading an encoded message by said EIR device, to produce a decoded message character string by decoding said encoded message;

wherein said EIR terminal is further configured to produce an output character string by formatting said decoded message character string according to one or more formatting commands;

wherein said formatting comprises excluding from said output character string a symbol of a specified encoding type according to a Discard Data formatting command.

2. The EIR terminal of claim 1, wherein said one or more formatting commands are stored in said memory.

3. The EIR terminal of claim 1 further configured to store said one or more formatting commands in said memory responsive to receiving said one or more formatting commands via one of: said EIR device and said communication interface.

4. The EIR terminal of claim 1, wherein said one or more formatting commands are grouped together into a data format.

5. The EIR terminal of claim 1, wherein said one or more formatting commands are grouped together into a data format; and wherein said data format comprises a parameter specifying a type of an EIR terminal to which said one or more formatting commands should only apply.

6. The EIR terminal of claim 1, wherein said one or more formatting commands are grouped together into a data format; and wherein said data format comprises a parameter specifying an identifier of a symbology, said parameter indicating that said one or more formatting commands should only apply to messages encoded using a symbology identified by said identifier.

7. The EIR terminal of claim 1, wherein said one or more formatting commands are grouped together into a data format; and wherein said data format comprises a parameter specifying a length of a message, said parameter indicating that said one or more formatting commands should only apply to messages having a length equal to a value of said parameter.

8. The EIR terminal of claim 1, wherein said one or more formatting commands are grouped together into a data format; and
  wherein one or more data formats are grouped into two or more data format groups defining a primary data format and one or more alternative data formats.

9. The EIR terminal of claim 1, wherein said one or more formatting commands are grouped together into a data format;
  wherein one or more data formats are grouped into two or more data format groups defining a primary data format and one or more alternative data formats; and
  wherein said EIR terminal is configured to switch between said primary and alternative data formats responsive to inputting a pre-defined message by said EIR device.

10. The EIR terminal of claim 1, wherein said one or more formatting commands are grouped together into a data format;
  wherein one or more data formats are grouped into two or more data format groups defining a primary data format and one or more alternative data formats; and
  wherein said EIR terminal is configured to switch between said primary and alternative data formats responsive to a user interface action.

* * * * *